United States Patent
Farrington

(10) Patent No.: US 7,050,309 B2
(45) Date of Patent: May 23, 2006

(54) POWER CONVERTER WITH OUTPUT INDUCTANCE

(75) Inventor: Richard Farrington, Heath, TX (US)

(73) Assignee: SynQor, Inc., Boxborough, MA (US)

(*) Notice: Subject to any disclaimer, the term of this patent is extended or adjusted under 35 U.S.C. 154(b) by 216 days.

(21) Appl. No.: 10/729,430

(22) Filed: Dec. 5, 2003

(65) Prior Publication Data

US 2004/0165405 A1     Aug. 26, 2004

Related U.S. Application Data

(60) Provisional application No. 60/431,673, filed on Dec. 6, 2002.

(51) Int. Cl.
*H02M 3/335*     (2006.01)

(52) U.S. Cl. .......................... 363/17; 363/97

(58) Field of Classification Search ................. 363/16, 363/17, 18, 20, 21.01, 95, 97, 125, 131
See application file for complete search history.

(56) References Cited

U.S. PATENT DOCUMENTS 3,663,941 A * 5/1972 Pasciutti ....................... 363/23
5,870,299 A * 2/1999 Rozman ....................... 363/127
5,999,417 A   12/1999 Schlecht

OTHER PUBLICATIONS

Mweene, L. Haachitaba, et al., "A High-Efficiency 1.5 kW, 390-50 V Half-Bridge Converter Operated at 100% Duty-Ratio," IEEE, 1992, pp. 723-730.

Mweene, Loveday Haachitaba, "The Design of Front-End DC-DC Converters of Distributed Power Supply Systems with Improved Efficiency and Stability," Thesis, Massachusetts Institute of Technology, Sep. 1992, pp. 1-184.

* cited by examiner

*Primary Examiner*—Adolf Berhane
(74) *Attorney, Agent, or Firm*—Hamilton, Brook, Smith, Reynolds, P.C.

(57) ABSTRACT

In a power converter, the duty cycle of a primary winding circuit causes near continuous flow of power through the primary and secondary winding circuits during normal operation. By providing no regulation during normal operation, a very efficient circuit is obtained with a synchronous rectifier in the secondary operating at all times. However, during certain conditions such as start up or a short-circuit, the duty cycle of the primary may be reduced to cause freewheeling periods. To simplify the gate drive, the synchronous rectifiers may be allowed to turn off during the freewheeling periods, resulting in large ripple. A filter inductance of the secondary winding circuit reduces that ripple, and is sufficient to minimize ripple during normal operation, but still allows large ripple during the freewheeling periods. By accepting large ripple during other than normal operation, a smaller filter inductance can be used.

17 Claims, 6 Drawing Sheets

POWER CONVERTER WITH OUTPUT INDUCTANCE

RELATED APPLICATION

This application claims the benefit of U.S. Provisional Application No. 60/431,673, filed Dec. 6, 2002. The entire teachings of the above application are incorporated herein by reference.

BACKGROUND OF THE INVENTION

U.S. Pat. No. 5,999,417 (the '417 patent), the entire teachings in which are incorporated herein by reference, discloses a power converter comprising a power source and a primary transformer winding circuit connected to the source. A secondary transformer winding circuit has at least one secondary winding coupled to a primary winding. Plural controlled rectifiers, such as voltage controlled field effect transistors, each having a parallel uncontrolled rectifier, are turned on and off in synchronization with the voltage waveform across a primary winding to provide an output. Each primary winding has a voltage waveform with a fixed duty cycle and transition times which are short relative to the on-state and off-state times of the controlled rectifiers. A regulator regulates the output while the fixed duty cycle is maintained.

SUMMARY OF THE INVENTION

A power converter of certain embodiments of the present invention comprises a primary winding circuit and a secondary winding circuit coupled to the primary winding circuit. The secondary winding circuit comprises a secondary transformer winding in series with a controlled rectifier having a parallel uncontrolled rectifier. A control circuit controls duty cycle of the primary winding circuit. The duty cycle causes near continuous flow of power through the primary and secondary winding circuits during normal operation. However, in other than normal operation, such as during start up or with a short-circuit of the output, the duty cycle is reduced to cause freewheeling periods. A small filter inductance in the secondary winding circuit is sufficient to minimize ripple during normal operation, but it allows large ripple resulting from the freewheeling when the duty cycle is reduced.

The converter may provide no regulation during normal operation. The controlled rectifiers may be caused to be off during a portion of each cycle when the duty cycle is reduced.

Where duty cycle is reduced to limit current, the duty cycle may be a function of sensed current. A control circuit may then compare the duty cycle to a threshold and shut down operation when the duty cycle drops below a duty cycle threshold.

The secondary winding circuit may comprise plural secondary transformer windings. For example, two secondary windings may be coupled to a single primary winding. The primary winding may be a full-bridge circuit and may comprise a capacitor in series with a primary winding.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
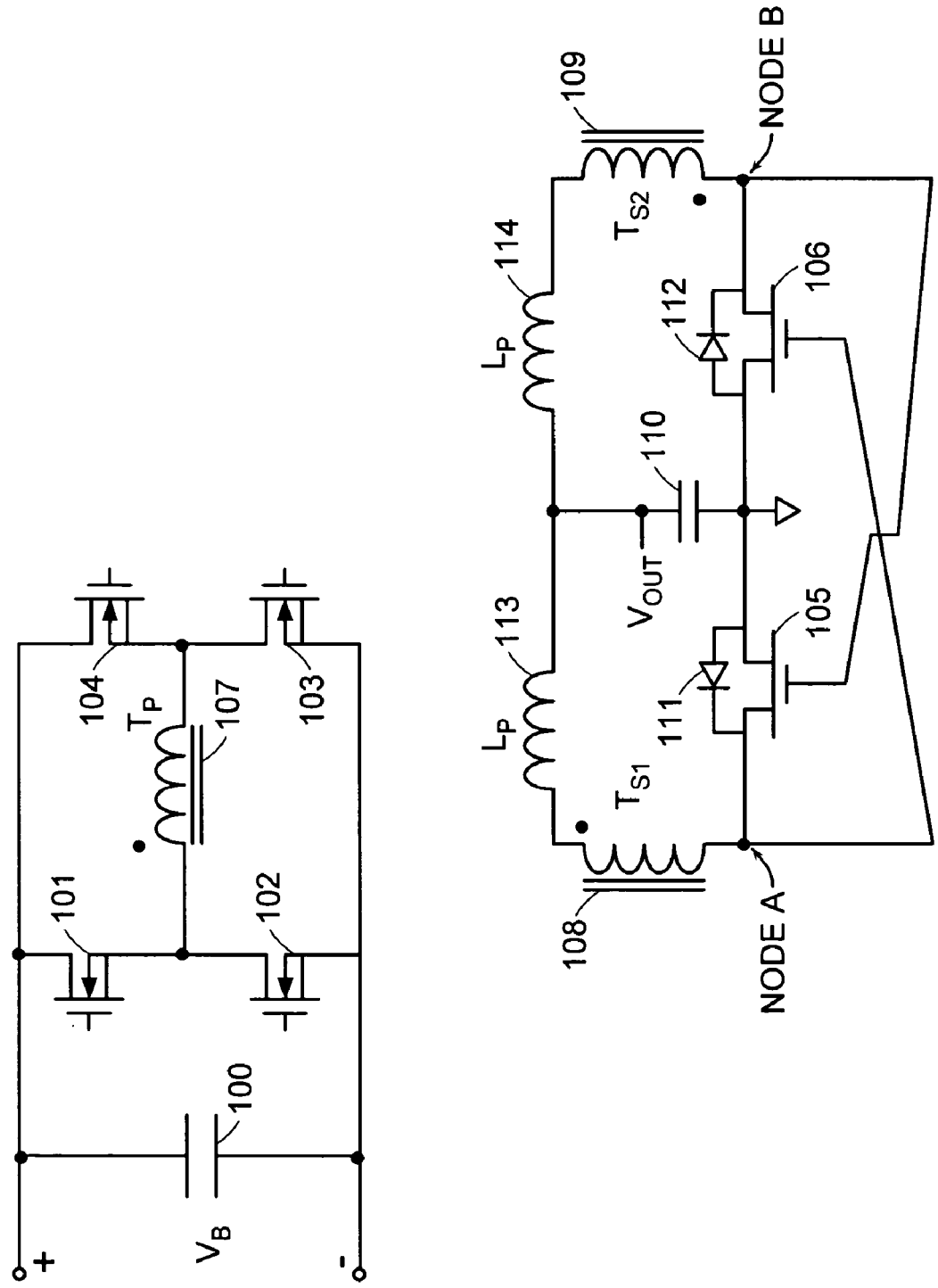
FIG. 1 shows a full-bridge, single-transformer, voltage-fed isolation stage that incorporates concepts of the '417 patent.

FIG. 1 shows a full-bridge, single-transformer, voltage-fed isolation stage that incorporates synchronous rectification and the concepts of the '417 patent. The operation of this isolation stage is as follows. For the first half of the cycle, MOSFETs 101 and 103 are turned on while MOSFETs 102 and 104 are left off, and the voltage $V_B$ is applied positively (according to the "dot" convention) across the transformer's primary winding 107. This voltage, modified by the transformer's turns-ratio, appears across the secondary windings with the appropriate polarity. Power flows into the transformer's primary winding, and out of the first secondary winding 108 to the output. The voltage at Node B is approximately twice the output voltage, and it causes the MOSFET synchronous rectifier 105 to be turned on. The voltage at Node A is therefore slightly below ground, which causes the MOSFET synchronous rectifier 106 to be turned off. These states of the rectifier switches are consistent with the power flowing out of the first secondary winding.

During the second half of the cycle, MOSFETs 102 and 104 are turned on while MOSFETs 101 and 103 are left off, and the voltage $V_B$ is applied negatively across the transformer's primary winding. This negative polarity causes MOSFET 106 to be turned on, MOSFET 105 to be turned off, and power to flow into the primary winding and out of the second secondary winding 109 to the output across capacitor 110.

The secondary windings are not tightly coupled to each other, as indicated with the parasitic inductances 113 and 114, to achieve the advantages discussed in the '417 patent. A similar setup was shown in the topology of FIG. 9 of the '417 patent since it also used a single transformer.

Figure 2:
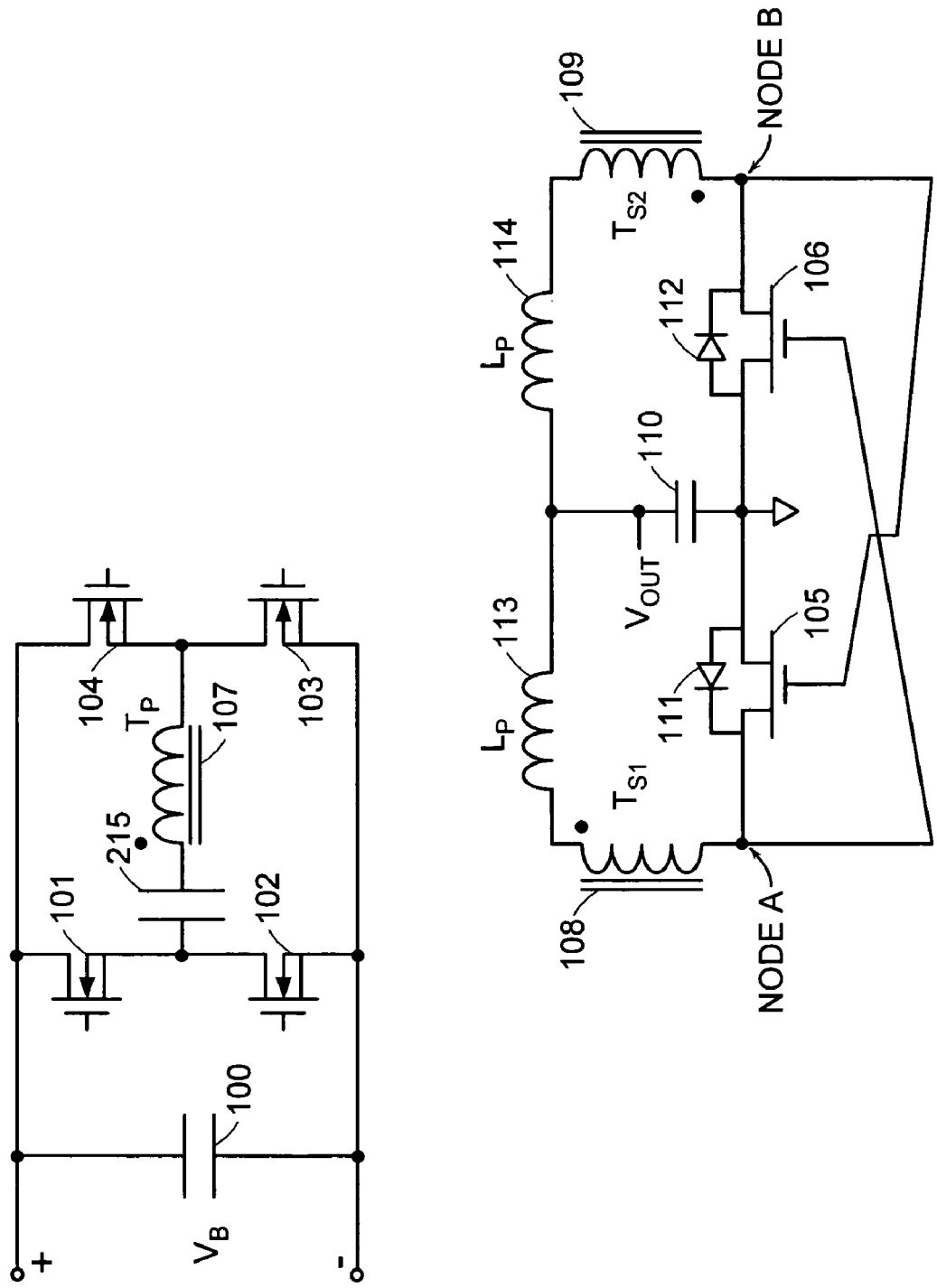
FIG. 2 illustrates the addition of a capacitor to the primary winding of FIG. 1.

Care must be taken in this isolation stage topology to insure that the magnetizing inductance of the transformer does not saturate. One way to do this is to place a large capacitor 215 in series with the primary winding, as shown in FIG. 2. This capacitor will assume a dc voltage across it that counters any imbalance there may be in the positive and negative volt-seconds of the waveforms created by MOSFETs 101–104. Alternatively, several well-known techniques to sense the magnetizing inductor's current could be used to modify the durations of the first and second halves of the cycle.

Figure 3:
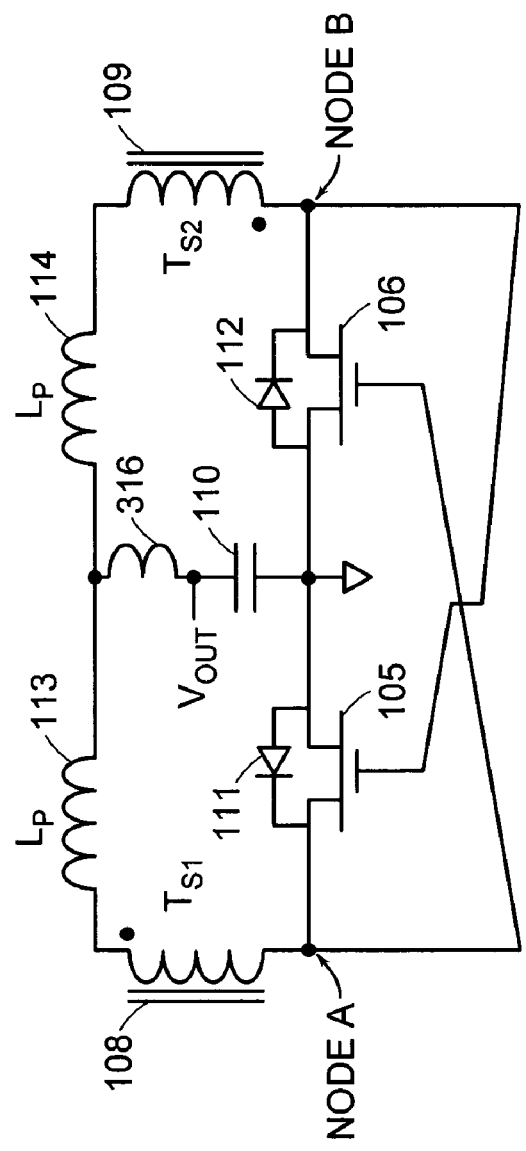
FIG. 3 illustrates the addition of an output filter inductor to the circuit of FIG. 2.
Figure 4A:
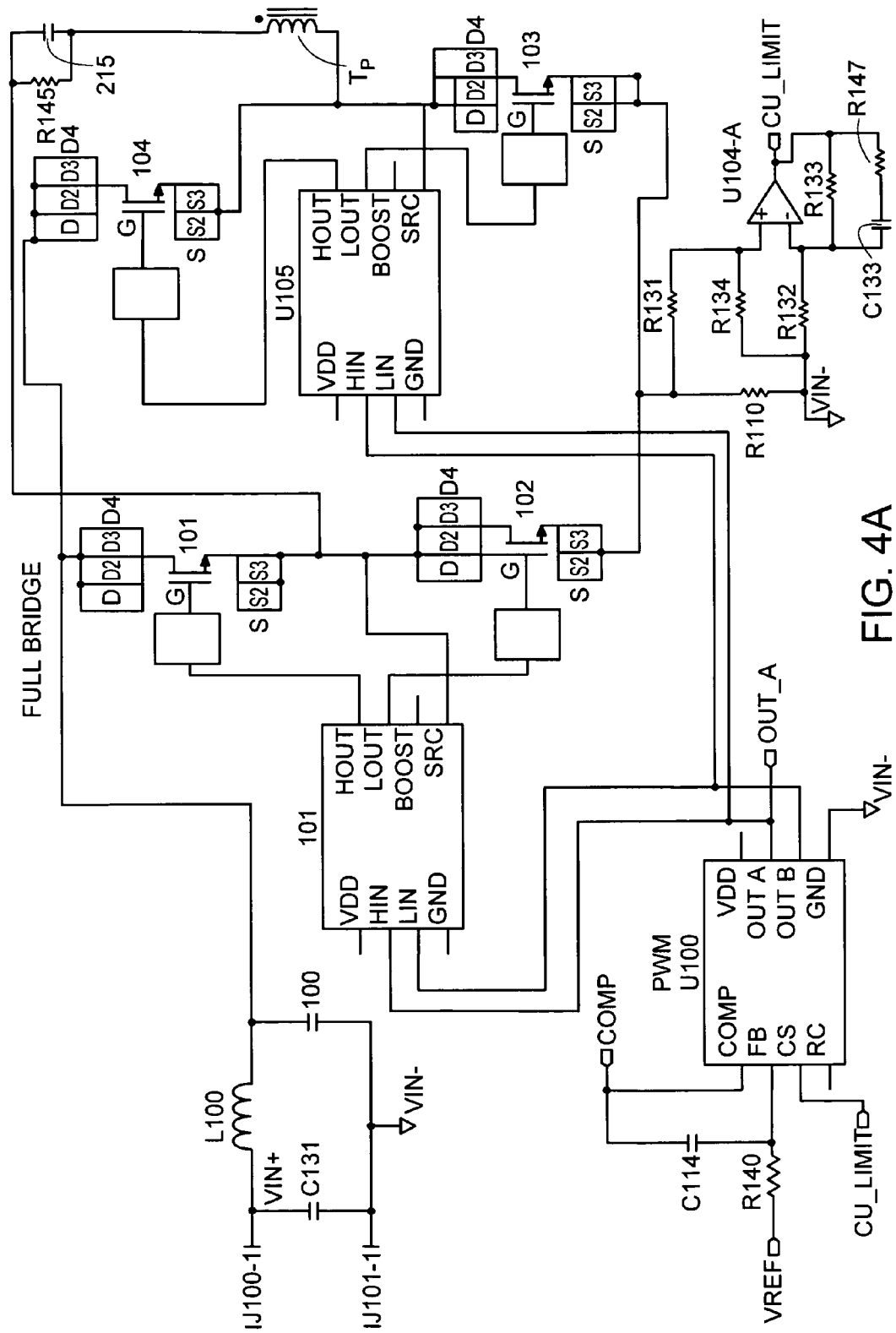
Figure 4B:
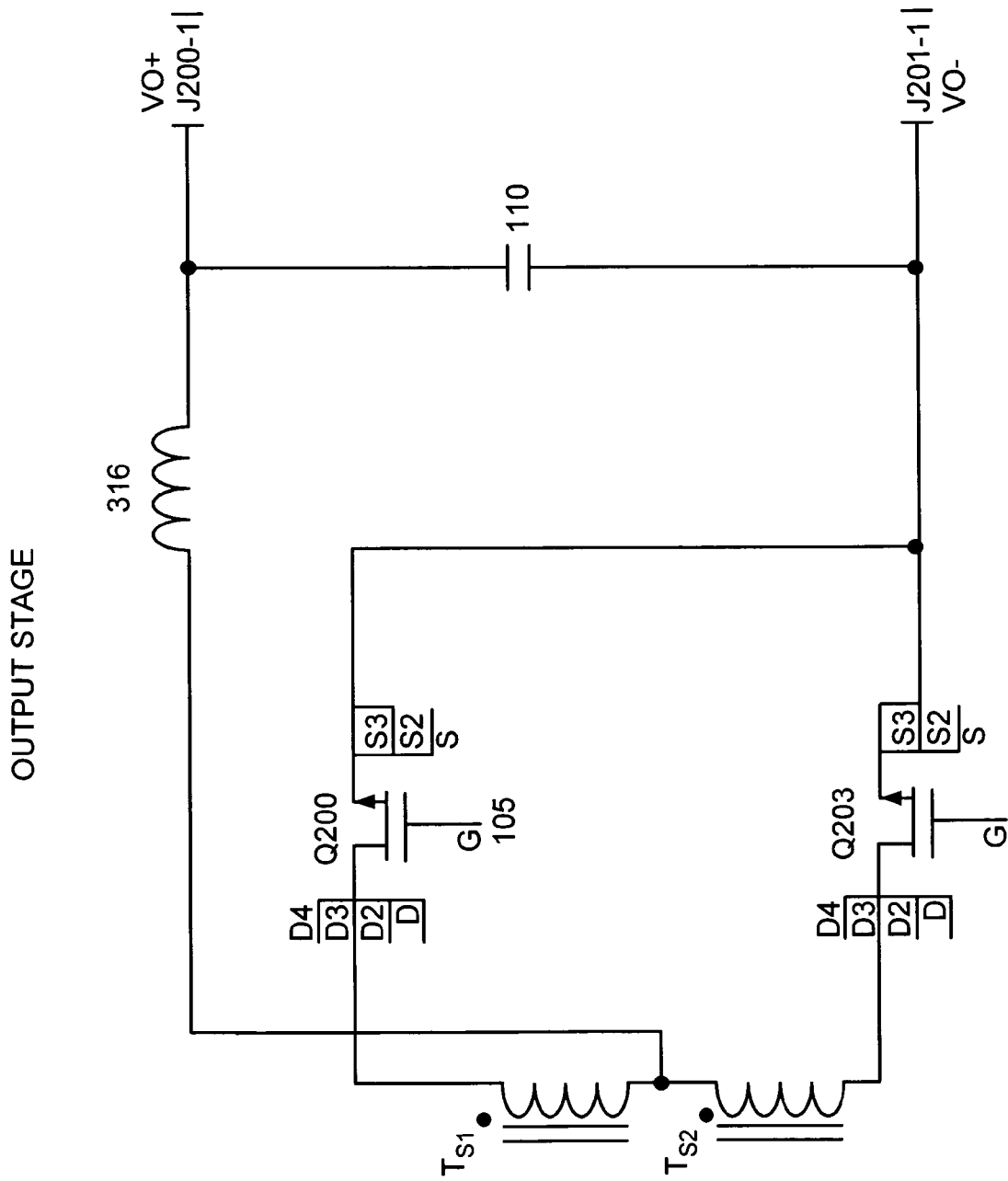
Figure 4C:
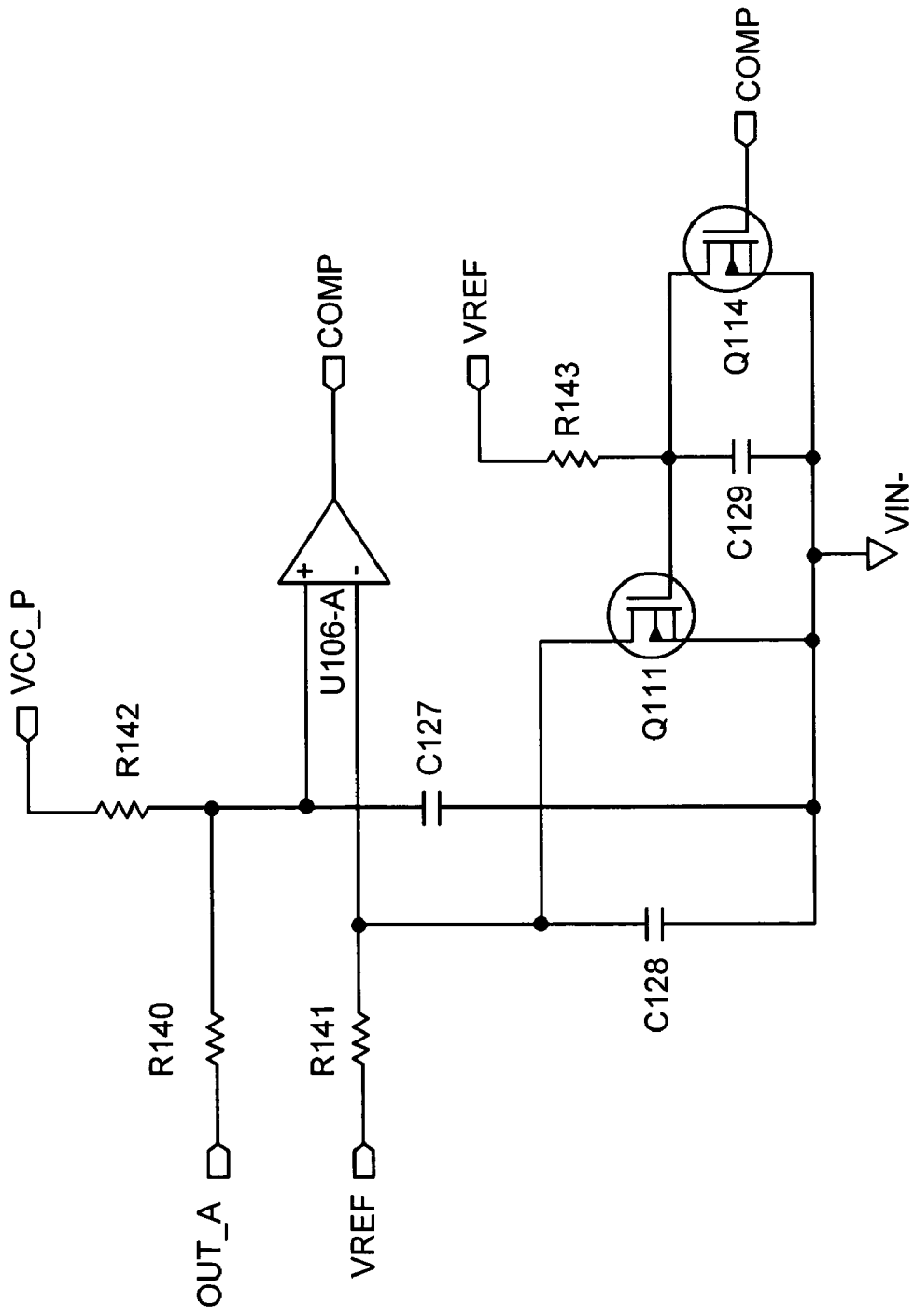

The filters at the output of the isolation stages in the '417 patent are composed of one or more capacitive and inductive elements. When the isolation stage is voltage-fed, it may be desirable to have the output filter begin with an inductor 316, as shown in FIG. 3. One benefit this approach provides is that the voltage-fed isolation stages can now be operated with a variable duty cycle control strategy to provide a soft-start capability or to limit current flow in a short-circuit condition. These functions could be provided by the regulation stages in the topologies depicted in the '417 patent, but if the isolation stage is not combined directly with a regulation stage in a single product, then it may be desirable to include these functional capabilities in the isolation stage, as well.

Under variable duty cycle control, the percentage of the overall cycle (the duty cycle) that MOSFETs 101 and 103 (or MOSFETs 102 and 104) conduct is reduced from the 50% value described above. For the remaining, freewheeling fraction of the half-cycle, either all of the primary-side MOSFETs are turned off, or at least the two top MOSFETs 101 and 104 or the two bottom MOSFETs 102 and 103 are turned off. During the freewheeling part of the cycle, both diodes 111 and 112 conduct the current flowing through inductor 316, and the voltage across the transformer windings is approximately zero. As is well know, this additional portion of the cycle permits the output voltage to be less than $V_B$ divided by the transformer's turns-ratio. How much less depends on the duty cycle.

Since during normal operation the isolation stage is operated at a fixed duty cycle in which power is always flowing from input to output (except during the brief switch transitions), the value of inductor 316 can be relatively small to achieve an acceptable output ripple. This reduces the size, cost, and power dissipation of this inductor compared to what it might have been. During those times when the isolation stage is operated under a variable duty cycle, the ripple in the inductor current may then become large, but the larger output voltage ripple that results can usually be tolerated for start-up and short-circuit conditions.

As mentioned above, during the freewheeling part of the cycle the diodes are carrying the inductor current. This is because the gate drive scheme shown in FIG. 3 would cause the MOSFET synchronous rectifiers to be off during this part of the cycle. The additional power dissipation that occurs due to the higher on-state voltage of the diodes compared to that of the MOSFETs can usually be tolerated for the start-up and short-circuit conditions because they are normally short in duration.

If the output voltage is high, then it may be desirable to use a capacitive divider technique described in the '417 patent to reduce the voltages applied to the gates of the MOSFET synchronous rectifiers below that of the voltages appearing at Nodes A and B.

Figure 4:
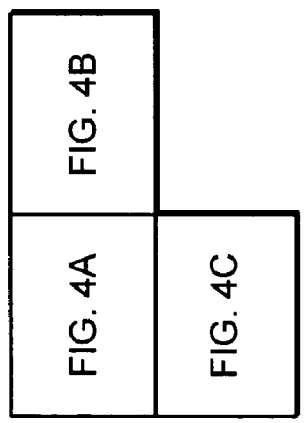
FIG. 4 shows a control circuit for the circuits of FIGS. 1–3 and embodying the present invention.

FIG. 4 shows a circuit schematic of a product based, in part, on the ideas presented here and in the '417 patent. The function of the product is to provide isolation and a transformation of the input voltage to the output voltage according to the turns-ratio of the transformer. It does not, in its normal state of operation, provide regulation. As such it is a very efficient product. One example of its use is to convert a 48V input to a 12V output by using a turns-ratio of 4:1. Since there is no regulation, if the input voltage varies +/−10%, so too will the output voltage vary +/−10%. In certain applications, this variation in the output is acceptable, and well worth the very high efficiency of the converter, which is 96% in this example.

In addition, since the converter of FIG. 4 does not provide regulation, its output voltage demonstrates a droop characteristic. By this it is meant that for any given input voltage, the output voltage drops slightly as the output current increases. For instance, the output voltage may drop 5% as the output current varies from 0% to 100% of the rated maximum value. This droop characteristic provides automatic current sharing between two or more such converters that might be place in parallel.

Note in this schematic that the IC labeled U100 is a pulse width modulator (PWM) control chip that is normally operated such that the gate drive signals that pass through gate drivers U101 and U105 give the fixed duty cycle operation of the full-bridge described above. If the current sensing amplifier U104-A senses that the current flowing on the primary side of the circuit exceeds a threshold value, it commands the PWM control chip to reduce its duty cycle by an amount determined by how large the current gets above the threshold value. This provides a current limiting scheme for the product that protects against a short-circuit condition.

Note also that comparator U106-A senses the duty cycle output of the PWM control chip, and compares it to a threshold. If the duty cycle falls below this threshold value, the output of the comparator causes the PWM control IC to shut down. The circuitry around this comparator, including transistors Q111 and Q114, provides a latching mechanism such that the PWM control IC remains off once this condition is observed.

While this invention has been particularly shown and described with references to preferred embodiments thereof, it will be understood by those skilled in the art that various changes in form and details may be made therein without departing from the scope of the invention encompassed by the appended claims.

For example, whereas the Figures show the secondary side rectification circuit arranged in a center tapped configuration with two secondary windings and two synchronous rectifiers, as is well known it could be a full wave rectification configuration. One could use a full-bridge rectification circuit in which there is only one secondary winding and four synchronous rectifiers. Such a circuit reduces voltage stress on the synchronous rectifiers when they are off by a factor of two during normal operation of the converter.

What is claimed is:

1. A power converter comprising:
   a primary winding circuit;
   a secondary winding circuit coupled to the primary winding circuit, a secondary winding circuit comprising a secondary transformer winding in series with a controlled rectifier having a parallel uncontrolled rectifier; and
   a control circuit which controls duty cycle of the primary winding circuit, the duty cycle causing near continuous flow of power through the primary and secondary winding circuits during normal operation but being reduced to cause freewheeling periods in other than normal operation, the duty cycle being reduced as a function of sensed current, the control circuit comparing the duty cycle to a threshold and shutting down operation when the duty cycle drops below the threshold.

2. A power converter as claimed in claim 1 wherein the controlled rectifier is caused to be off during a portion of each cycle when the duty cycle is reduced.

3. A power converter as claimed in claim 1 wherein the duty cycle is reduced to limit current.

4. A power converter as claimed in claim 1 wherein the secondary winding circuit comprises plural secondary transformer windings.

5. A power converter as claimed in claim 1 wherein the primary winding circuit includes a single primary winding and the secondary winding circuit includes two secondary windings coupled to the single primary winding.

6. A power converter as claimed in claim 5 wherein the primary winding is in a full bridge circuit.

7. A power converter as claimed in claim 6, further comprising a capacitor in series with the primary winding.

8. A power converter as claimed in claim 1 wherein the converter provides no regulation during normal operation.

9. A method of converting power comprising:

providing power to primary and secondary transformer windings, there being a controlled rectifier having a parallel uncontrolled rectifier in series with the secondary transformer winding;

controlling duty cycle of the power to the primary winding, the duty cycle causing near continuous flow of power through the primary and secondary winding circuits during normal operation but being reduced to cause freewheeling periods in other than normal operation, the duty cycle being reduced as a function of sensed current; and comparing the duty cycle to a threshold and shutting down operation when the duty cycle drops below the threshold.

10. A method as claimed in claim 9 wherein the controlled rectifiers are caused to be off during a portion of each cycle when the duty cycle is reduced.

11. A method as claimed in claim 9 wherein the duty cycle is reduced to limit current.

12. A method as claimed in claim 9 wherein the power is applied to plural secondary windings.

13. A method as claimed in claim 9 wherein power is applied through a single primary winding and two secondary windings coupled to the single primary winding.

14. A method as claimed in claim 13 wherein the primary winding is in a full-bridge circuit.

15. A method as claimed in claim 14 wherein a capacitor is in series with the primary winding.

16. A method as claimed in claim 9 wherein the converter provides no regulation during normal operation.

17. A power converter comprising:

primary and secondary transformer windings, there being a controlled rectifier having a parallel uncontrolled rectifier in series with the secondary transformer winding;

means for controlling duty cycle of the power to the primary winding, the duty cycle causing near continuous flow at power through the primary and secondary winding circuits during normal operation but being reduced to cause freewheeling periods in other than normal operation, the duty cycle being reduced as a function of sensed current; and means for comparing the duty cycle to a threshold and shutting down operation when the duty cycle drops below the threshold.

* * * * *